(12) United States Patent
Stephan et al.

(10) Patent No.: US 11,377,840 B2
(45) Date of Patent: Jul. 5, 2022

(54) ONE-PIECE BONDING SPLICE FOR RAILS

(71) Applicant: PEGASUS SOLAR, INC., Richmond, CA (US)

(72) Inventors: Erich Kai Stephan, Richmond, CA (US); Glenn Harris, Richmond, CA (US); Peter Wilke, Richmond, CA (US); Nicholas Wenzel, Richmond, CA (US); James Hsieh, Richmond, CA (US)

(73) Assignee: PEGASUS SOLAR INC., Richmond, CA (US)

(*) Notice: Subject to any disclaimer, the term of this patent is extended or adjusted under 35 U.S.C. 154(b) by 0 days.

(21) Appl. No.: 17/103,682

(22) Filed: Nov. 24, 2020

(65) Prior Publication Data

US 2021/0156135 A1   May 27, 2021

Related U.S. Application Data

(60) Provisional application No. 62/940,771, filed on Nov. 26, 2019.

(51) Int. Cl.
*E04B 1/24* (2006.01)
*E04C 3/07* (2006.01)
*E04C 3/04* (2006.01)

(52) U.S. Cl.
CPC .............. *E04B 1/2403* (2013.01); *E04C 3/07* (2013.01); *E04B 2001/2415* (2013.01); *E04B 2001/2433* (2013.01); *E04B 2001/2448* (2013.01); *E04B 2001/2457* (2013.01); *E04C 2003/0417* (2013.01); *E04C 2003/0439* (2013.01); *E04C 2003/0473* (2013.01)

(58) Field of Classification Search
CPC ........... E04B 1/2403; E04B 2001/2457; E04B 2001/2415; E04B 2001/2433; E04B 2001/2448; E04C 3/07; E04C 2003/0417; E04C 2003/0439; E04C 2003/0473; H02S 20/00; H01R 25/162; F24S 25/65; Y02E 10/47; Y02E 10/50
See application file for complete search history.

(56) References Cited

U.S. PATENT DOCUMENTS

| | | | |
|---|---|---|---|
| 4,159,758 A * | 7/1979 | Courson | B66B 23/22 198/335 |
| 4,269,043 A * | 5/1981 | Kizu | F16D 3/76 464/83 |
| 4,570,408 A * | 2/1986 | Frascaroli | E04B 1/5831 403/176 |

(Continued)

OTHER PUBLICATIONS

International Search Report and Written Opinion from the International Searching Authority, dated Mar. 30, 2021, 11 pages, for corresponding International Patent Application No. PCT/US2020/062406.

*Primary Examiner* — Jessie T Fonseca
(74) *Attorney, Agent, or Firm* — Polsinelli LLP

(57) ABSTRACT

A splice having a main body and one or more protrusions extending from the main body. The one or more protrusions can be operable to interfere with a rail when the main body is installed into an opening of the rail. The one or more protrusions may be operable to cut into a coating of the rail and form an electrical connection between the rail and the main body.

12 Claims, 13 Drawing Sheets

(56) References Cited

U.S. PATENT DOCUMENTS

| | | | | |
|---|---|---|---|---|
| 4,950,841 | A * | 8/1990 | Walker | H01R 25/162 |
| | | | | 174/16.2 |
| 5,144,780 | A * | 9/1992 | Gieling | E04B 1/5831 |
| | | | | 135/114 |
| 5,203,135 | A * | 4/1993 | Bastian | F16B 7/0413 |
| | | | | 403/292 |
| 6,874,971 | B2 * | 4/2005 | Albaugh | F16B 2/04 |
| | | | | 403/297 |
| 7,832,180 | B2 * | 11/2010 | Dolby | E04B 2/96 |
| | | | | 52/848 |
| 7,866,098 | B2 * | 1/2011 | Cinnamon | F24S 25/67 |
| | | | | 52/173.3 |
| 8,695,290 | B1 | 4/2014 | Kim | F24S 25/67 |
| | | | | 52/173.3 |
| 9,121,433 | B1 * | 9/2015 | Bacon | F16B 7/0446 |
| 9,590,405 | B1 * | 3/2017 | Maurer | H01R 25/145 |
| 9,590,406 | B1 * | 3/2017 | Maurer | H02G 5/007 |
| 9,705,299 | B1 * | 7/2017 | Maurer | H02G 5/007 |
| 9,837,954 | B2 * | 12/2017 | Ash | F24S 25/65 |
| 2010/0281793 | A1 | 11/2010 | McPheeters et al. | |
| 2011/0194886 | A1 * | 8/2011 | Wu | E06B 3/9681 |
| | | | | 403/23 |
| 2011/0240101 | A1 | 10/2011 | Sagayama et al. | |
| 2014/0026946 | A1 | 1/2014 | West et al. | |
| 2014/0165499 | A1 * | 6/2014 | Vanker | E04C 3/07 |
| | | | | 52/834 |
| 2015/0180404 | A1 | 6/2015 | Braunstein et al. | |
| 2015/0226246 | A1 | 8/2015 | Kirchner | |
| 2015/0357773 | A1 * | 12/2015 | Schirmeier | B60M 1/346 |
| | | | | 439/121 |
| 2016/0156169 | A1 * | 6/2016 | Jaena | H02G 5/007 |
| | | | | 439/213 |
| 2016/0329671 | A1 * | 11/2016 | Kokenda | H01R 25/145 |
| 2017/0063301 | A1 | 3/2017 | Ash | |
| 2017/0201080 | A1 * | 7/2017 | Maurer | H02B 1/21 |
| 2017/0233996 | A1 * | 8/2017 | Abernathy | F16B 7/0446 |
| | | | | 52/698 |
| 2018/0094418 | A1 * | 4/2018 | Winter | E04B 1/5831 |
| 2018/0245331 | A1 * | 8/2018 | Tang | E04C 3/07 |
| 2019/0211543 | A1 * | 7/2019 | Abernathy | E04B 1/2403 |
| 2020/0056370 | A1 * | 2/2020 | Hebiishi | E04B 1/58 |
| 2020/0403559 | A1 * | 12/2020 | Kresse | H01L 31/042 |

* cited by examiner

ONE-PIECE BONDING SPLICE FOR RAILS

CROSS-REFERENCE TO RELATED APPLICATION

This application claims the benefit of, and priority to, U.S. Provisional Patent Application No. 62/940,771, filed on Nov. 26, 2019, entitled "ONE-PIECE BONDING SPLICE FOR RAILS," the full disclosure of which is hereby expressly incorporated by reference in its entirety.

BACKGROUND

Current solar mounting solutions using rails as mounting structure use one or more splices to connect rails together. Current splice designs typically require an assembly of components to mechanically secure and electrically bond splice to a rail section and to adjoin two rail sections together.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Figure 1:
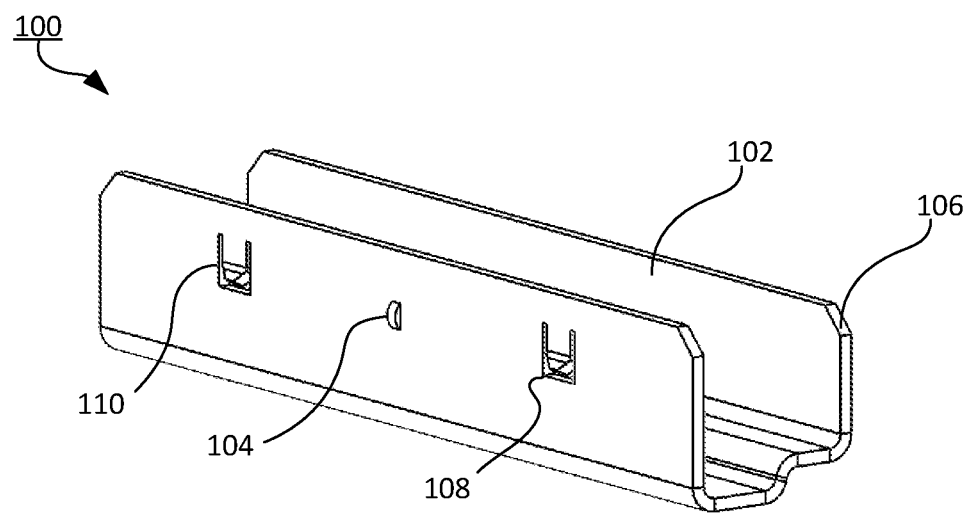
FIG. 1 illustrates isometric views of a splice.

FIG. 1 depicts an isometric view of splice 100. Splice 100 may have a main body 102. Main body 102 may define a shape for and provide structure to and support for splice 100. Main body 102 may have sidewalls defining a generally "U" shaped extruded design. In some embodiments, main body 102 may be constructed utilizing bent sheet metal. Additionally, main body 102 can be formed from a uniform material. In some embodiments, the material of main body 102 and/or other features of splice 100 may have a higher material hardness than that of a rail (e.g., rail 200 as depicted in FIG. 3).

Figure 3:
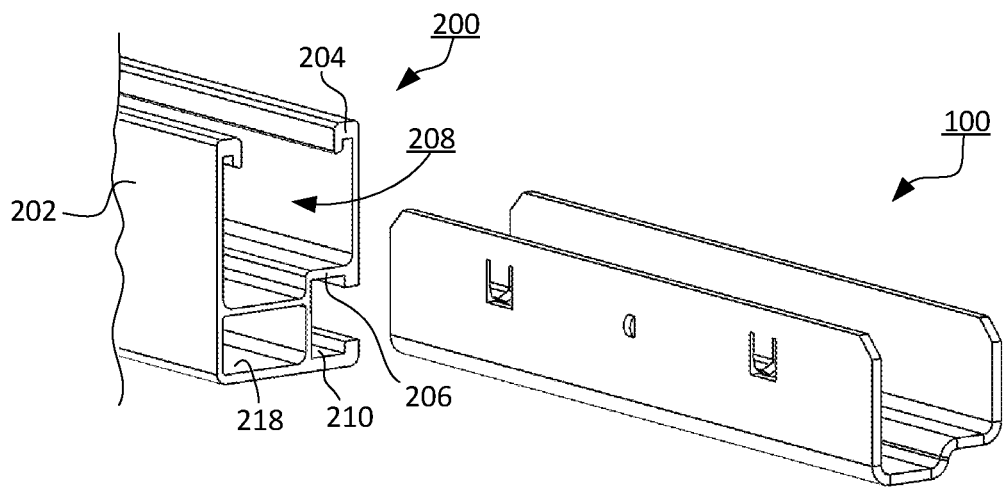
FIGS. 3-5 illustrate various steps of installation of a splice into a rail.

Moreover, main body 102 may have chamfers 106 on outer edges to provide ease of alignment and installation of splice 100 into a rail (e.g., rail 200 as depicted in FIG. 3). Furthermore, main body 102 may also have an abutment protrusion 104 and one or more spring flanges 110.

One or more abutment protrusions 104 can be positioned to protrude from one or more surfaces of main body 102. In some embodiments, abutment protrusion 104 is positioned substantially along a mid-plane of main body 102. Abutment protrusion 104 is operable to abut against an edge of rail 200 and provide a stopping point as splice 100 is installed into rail 200. Accordingly, abutment protrusion 104 can prevent splice 100 from being inserted too far into rail 200. It is to be understood, however, that abutment protrusion 104 can be positioned at any position with respect to main body 102 to control a desired installed position of splice 100 in rail 200.

One or more spring flanges 110 can protrude from an aperture 108 of main body 102. Spring flanges 110 can be generally co-planar to main body 102. In some embodiments, spring flanges 110 can extend at an angle away from a center of splice 100.

Figure 2:
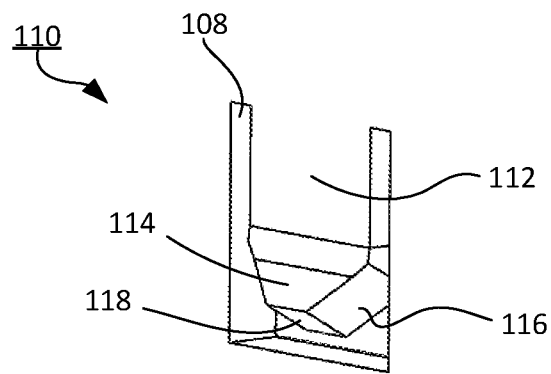
FIG. 2 illustrates a close-up isometric view of a bonding flange.

FIG. 2 depicts a close-up view of spring flanges 110. Spring flanges 110 may have a main flange body 112, a flange tab 114, chamfered tab edges 116, and a bonding edge 118.

Flange body 112 can be oriented substantially co-planar to main body 102, protrude inward into main body 102, or protrude outward of main body 102. Flange body 112 provides structural support to spring flanges 110, so that spring flanges 110 do not break off when in contact with rail 200.

Flange tab 114 may protrude and/or bend at an angle away from the outer surface of splice 100. Thus, flange tab 114 can angle outwardly away from a flange body 112 that is coincident to main body 102. Similarly, flange tab 114 can be coincident with a flange body 112 that protrudes outwardly away from main body 102. Flange tab 114 may have a stiffness or spring coefficient to prevent splice 100 from readily sliding or wiggling out of rail 200, but not so much stiffness to prevent the removal of a splice 100 from being removed from a rail 200 by an average human.

Flange tab 114 may have a bonding edge 118. Bonding edge 118 can be sufficiently dimensioned to pierce a coating on a rail (e.g., rail 200) upon splice 100 being forcibly inserted into the rail. In some embodiments, bonding edge 118 can be coined to have a smooth surface to prevent chafing with wires installed therein. Spring flange 110 may have a stiffness (e.g., via structural rigidity provided by flange body 112 and/or flange tab 114) to cause bonding edge 118 to pierce a coating of rail 200, such as anodization, paint, or powder coating, in order to cause an electrical bonding path (e.g., an electrical connection). For example, the electrical bonding path provides an electrical connection to dissipate rogue electricity (e.g., from a short, a lightning strike, etc.).

Flange tab 114 may have chamfered tab edges 116 that partially define bonding edge 118. Chamfered tab edges 116 may reduce a volume of flange tab 114 to prevent flange tab 114 from interfering with a rail that splice 100 is being installed into. Furthermore, chamfered tab edges 116 provide a smaller volume to flange tab 114 to provide an easier installation of splice 100 into a rail.

It is further contemplated that in other example embodiments not shown, flange body 112, associated orientations of flange tab 114, and bonding edge 118 may extend along a length of main body 102. In that example, spring flange 110 may act as a barb, allowing splice 100 to easily be installed into rail 200, but requiring much greater force to remove from rail 200.

Figure 4:
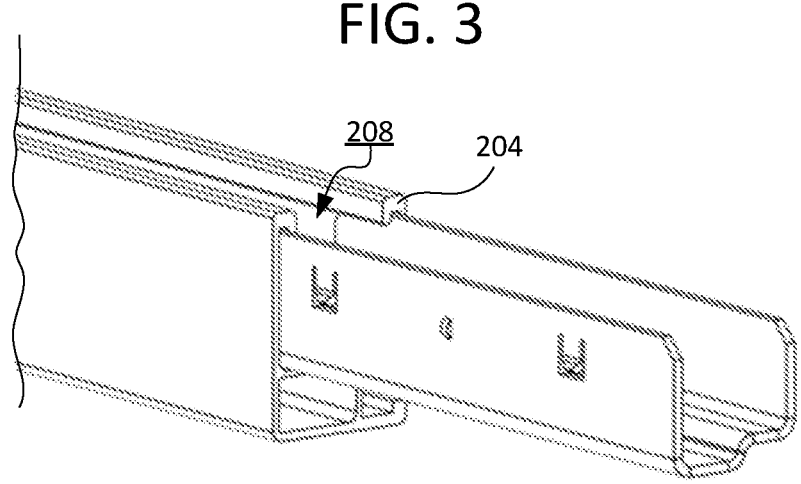
Figure 5:
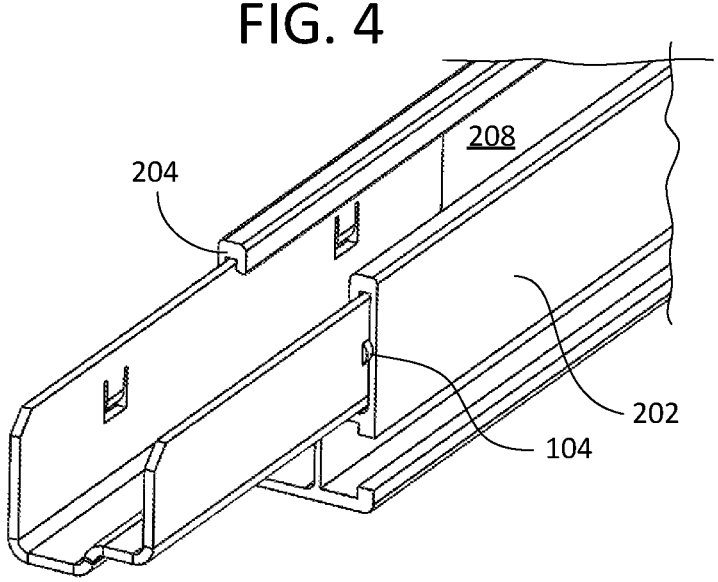

FIGS. 3-5 depict various steps of installation of splice 100 into a rail 200. More specifically, FIG. 3 depicts an isometric view of splice 100 being positioned in front of a rail 200. Rail 200 can have a rail body 202 that has guides 204, inner walls 206, fastener channel 210, and a structural cavity 218.

Rail body 202 provides overall structural support to rail 200. Rail body 202 may also have a generally rectangular extruded design. It is understood, however, that rail body 202 may have a wide variety of various shapes to accommodate a splice 100 installed therein. Ends of rail body 202 may have openings (e.g., an end where there is access to cavity 208, fastener channel 210, and/or structural cavity 218) to allow splice 100 to be installed therethrough.

Additionally, rail body 202 may have guides 204 that facilitate installation of splice 100 into rail 200. As shown, guides 204 may extend inward over rail body 202. In some embodiments, guides 204 may also protrude downwards into a cavity 208 of rail body 202 to provide lateral support and securement to splice 100 when splice 100 is installed therein. Furthermore, guides 204 may define a distance between a distal end of guides 204 and a sidewall of rail body 202. The distance may be operable to be substantially equal to a width of a sidewall of splice 100, such that sidewalls of main body 102 can fit into the distance, but not so loosely that there is excess lateral movement.

Inner walls 206 may be configured inside of rail body 202 to provide additional structural support to rail 200. Additionally, inner walls 206 and rail body 202 can at least partially define cavity 208. Furthermore, inner walls 206 and rail body 202 can be configured to define cavity 208 in any desired shape or form, such that cavity 208 can then be designed to receive splices 100 of the desired shape or form. In other words, inner walls 206 and rail body 202 can be used to design cavity 208 to accept and receive only splices 100 of the desired shape.

As will be discussed further below, rail 200 may also have a fastener channel 210. Fastener channel 210 is operable to receive a fastener to secure rail 200 (and splice 100 installed therein) to a mounting assembly.

Structural cavity 218 can be defined by inner walls 206 and main body 202. Structural cavities can provide reduced usage of materials, while also maintaining structural support to rail 200. Furthermore, each rail 200 can have any number of structural cavities defined by inner walls 206 and in any shape or size as desired (e.g., FIG. 22).

FIG. 4 depicts splice 100 being partially inserted into rail 200 as a second step of the installation process. At this stage, splice 100 is partially inserted into cavity 208 of rail 200. Furthermore, flange tab 114 has not yet come into contact with rail 200 and splice 100 can continue sliding into rail 200 with minimal obstruction. Moreover, splice 100 can slide along guides 204 of rail 200 to facilitate precise installation of splice 100 into rail 200 and minimize undesired lateral or vertical movement.

FIG. 5 depicts an isometric view of splice 100 fully installed into an end of a rail 200. In this example embodiment, abutment protrusion 104 is substantially coincident with and/or abutting against an end edge of rail 200. At this step, one spring flange 110 has compressed and/or flexed towards the inward plane of splice 100, while bonding edge 118 has engaged or is in communication with an inner surface of rail body 202.

Figure 6:
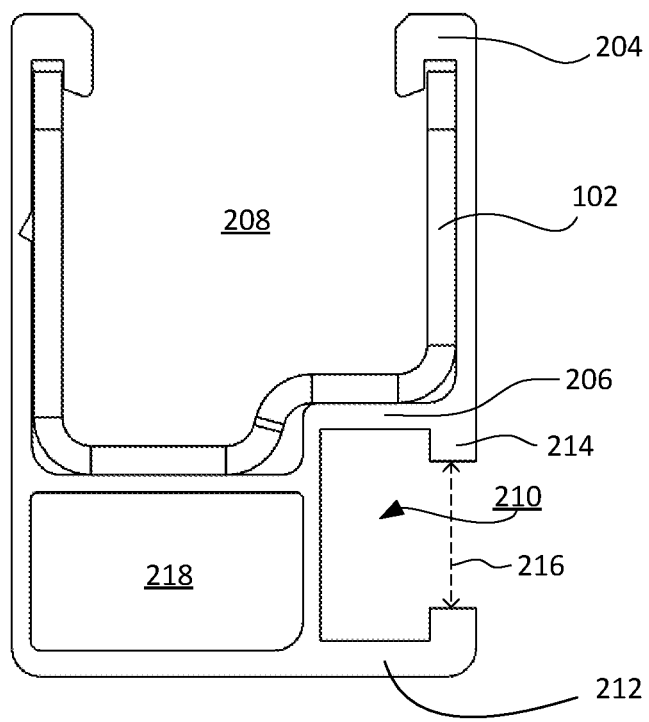
FIG. 6 illustrates an end-view of a splice installed into a rail.

FIG. 6 is an end view of a splice 100 installed into a rail 200. In this example embodiment, the second (outer) spring flange 110 is visible, and shown to protrude at an angle away from the centerline of splice and into the dimension of rail 200. Although not shown, in some embodiments, the first (inner spring flange that is installed and abutting against an inner surface of rail 200) spring flange 110 can have a portion (e.g., flange body 112 and/or a portion of flange tab 114) protruding inwards into cavity 208.

As further shown in FIG. 6, rail body 202 and inner walls 206 can define cavity 208 to have a shape similar to splice 100. For example, inner walls 206 form a chamfer in cavity 208, such that cavity 208 can accept splices 100 that have a similar chamfer.

Additionally, guides 204 can extend over main body 102 and inwards into cavity 208 to reduce and/or prevent lateral movement of splice 100 as splice 100 is installed in rail 200.

As will be discussed in further detail below, rail body 202 can also have a fastener channel 210 defined by a bottom wall 212 and channel flanges 214.

Figure 7:
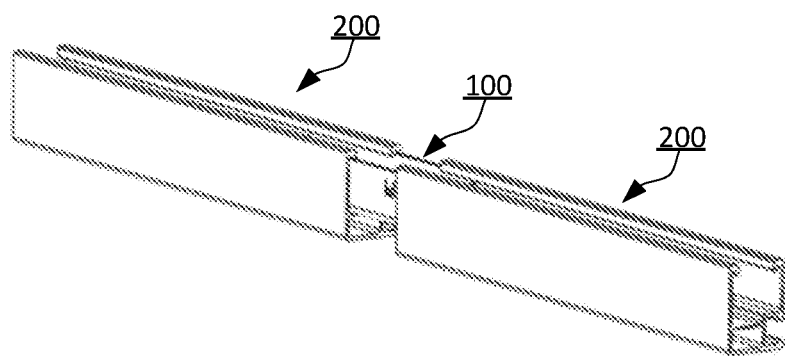
FIGS. 7-8 illustrate various steps of installation of a second rail onto a splice.

FIG. 7 depict a second rail 200 being installed onto a second end of splice 100. After a first rail 200 is installed onto splice 100, a second rail 200 can be installed onto splice 100. In this example embodiment, a first end of splice 100 has already been installed into a first rail 200, as shown in previous figures. The second rail 200 can slide onto splice 100, while utilizing all of the above mentioned features (e.g., guides 204, inner walls 206, etc.).

Figure 8:
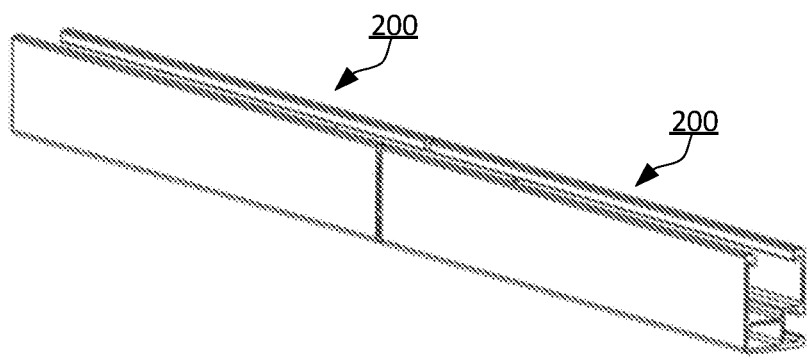

FIG. 8 shows second rail 200 installed onto splice 100. When both first and second rails 200 are installed on splice 100, splice 100 is obscured from view.

It is further considered that splice 100 may fit through an opening to structural cavity 218. As discussed above, structural cavity 218 can have a wide variety of different shapes based on inner walls 206. Thus, structural cavity 218 can be operable to accommodate splice 100 based on a configuration of inner walls 206.

Figure 9:
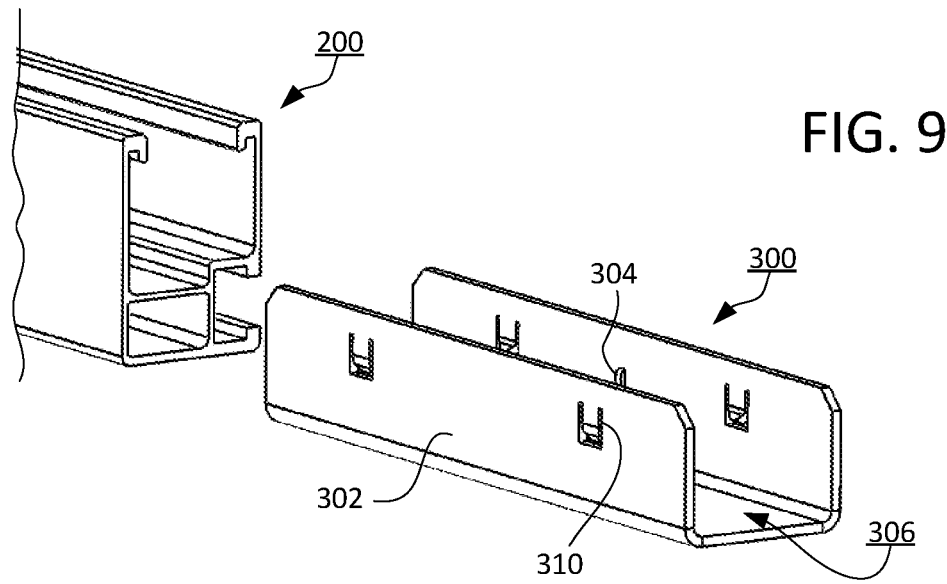
FIGS. 9-11 illustrate various steps of installation of an example external splice with one or more rails.

FIG. 9 depicts an alternative embodiment of the present invention, where an external splice 300 has a main body 302 defining a cavity 306 that is wider than rail 200. In this example embodiment, spring flanges 310 and associated features, and abutment protrusion 304 protrude inward towards the centerline of rail 200. This allows for bonding edge 118 to scrape an outer surface of rail 200 as external splice 300 is installed. In other example embodiments not shown, external splice 300 may have inward facing protrusions that align into the fastener channel 210.

Figure 10:
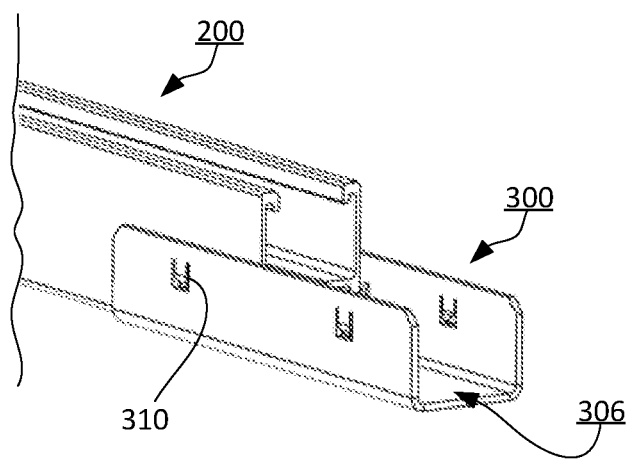

FIG. 10 depicts an external splice 300 installed onto a first rail 200 so that abutment protrusion 104 is substantially coincident with and/or abutted against an end edge of rail 200.

Figure 11:
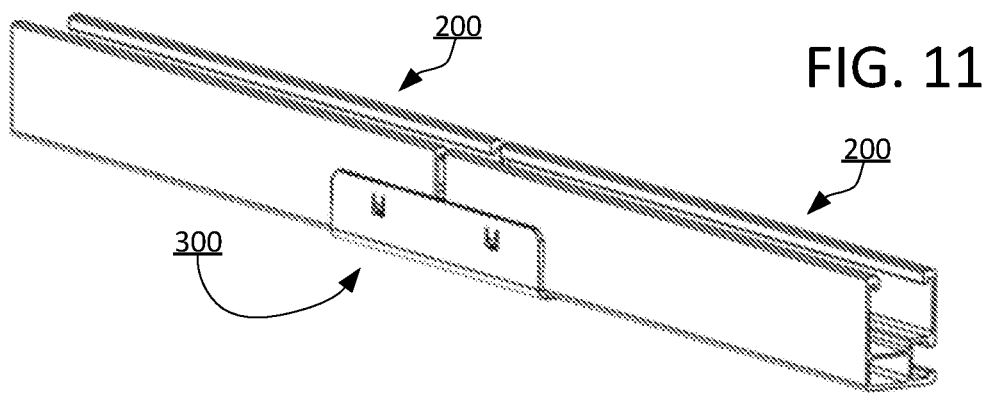

FIG. 11 depicts a second rail 200 installed onto a second end of external splice 300. In some embodiments not shown, external splice 300 may extend above the height of rail 200 and may have a horizontal flange that extends inward toward the centerline and over the top edge of rail 200.

Figure 12:
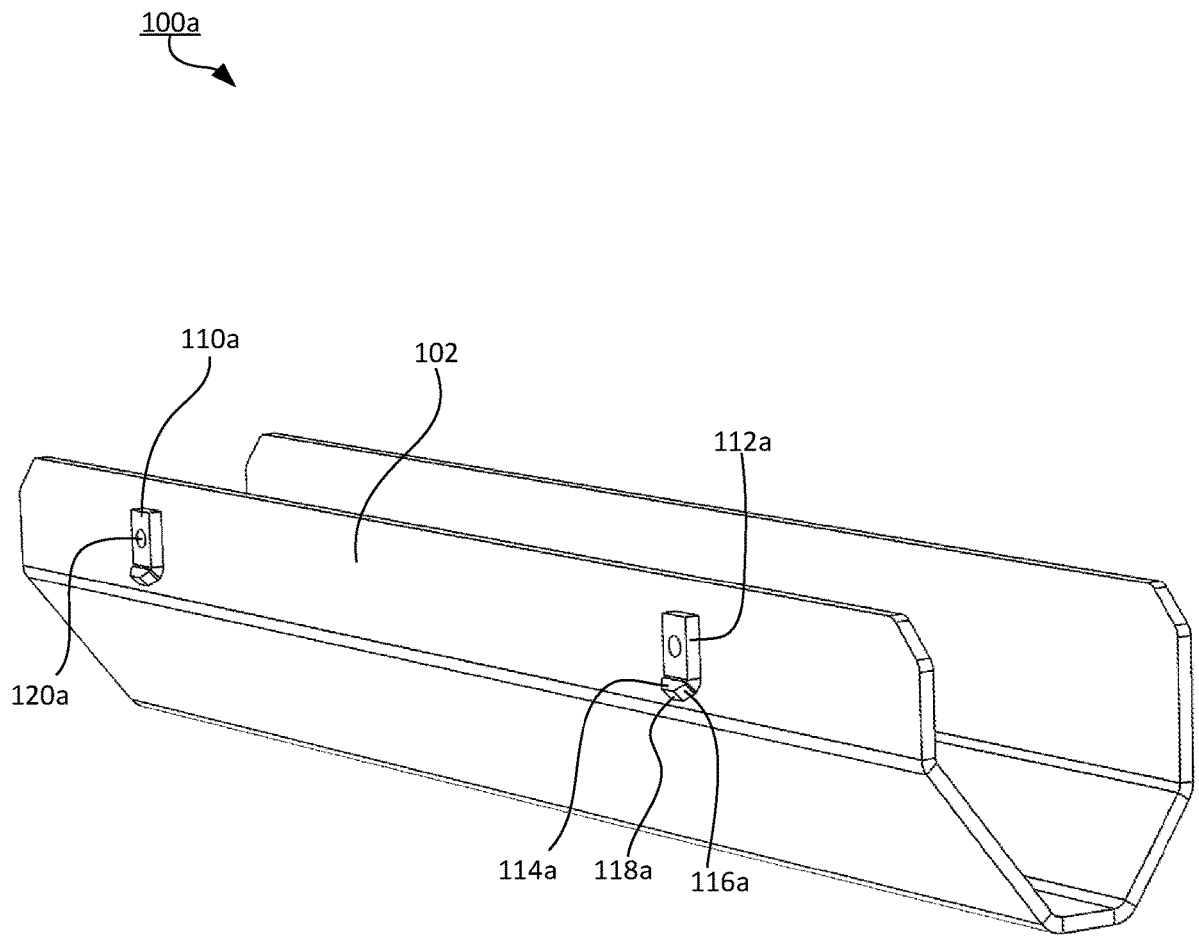
FIG. 12 illustrates an upper perspective view of another example of a splice.

FIG. 12 depicts another example splice 100a. As shown, splice 100a can have flanges 110a externally constructed on main body 102 and have features of splice 100 (e.g., main body 102). Flanges 110a can be attached to main body 102 by a wide variety of different methods including, but not limited to, welding, rivets, fasteners, etc. Flanges 110a can be constructed of the same or different materials of main body 102 (e.g., metal). Additionally, flanges 110a can have various elements with similar properties as those of spring flanges 110 of splice 100, such as a flange body 112a, flange tab 114a, chamfered edges 116a, and bonding edge 118a. Additionally, flanges 110a can have attachment mechanisms 120a, such as rivets, screws, bolts, to attach onto main body 102.

Figure 13A:
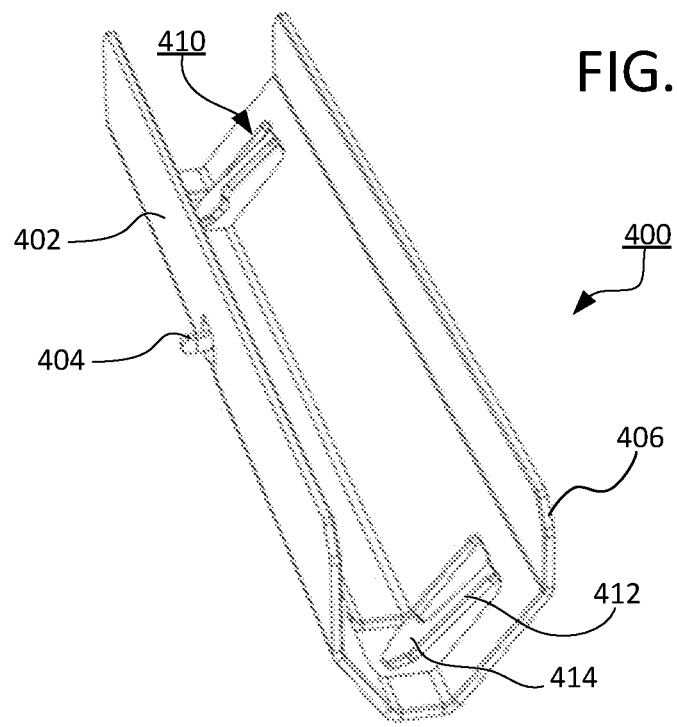
FIG. 13A illustrates an isometric view of another example of a splice.

FIG. 13A depicts another example splice 400 in an isometric view. Like splice 100, splice 400 can have a main body 402, abutment protrusions 404, chamfers 406, and spring flange 410.

Figure 16:
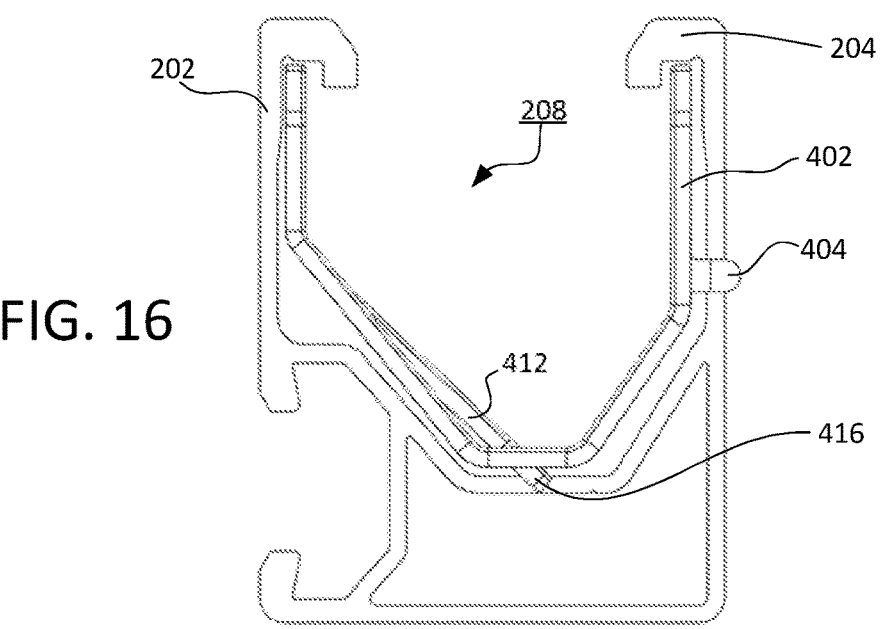
FIG. 16 illustrates an end-view of the splice of FIG. 13A installed into another example rail.

Main body 402 may define a shape for and provide structure to and support for splice 100. Main body 402 may have sidewalls defining a generally "U" shaped extruded design. Moreover, main body 402 may have chamfers 406 on outer edges to provide ease of alignment and installation of splice 400 into a rail (e.g., rail 200 as depicted in FIG. 16). Furthermore, main body 402 may also have an abutment protrusion 404 and one or more spring flanges 410. In some embodiments, an interior surface and/or edges of main body 102 can be coined to be rounded, so that materials inside of the main body 402 (e.g., wires) will not chafe against burrs.

One or more abutment protrusions 404 can be positioned to protrude from one or more surfaces of main body 402. In some embodiments, abutment protrusion 404 is positioned substantially along a mid-plane of main body 402. Abutment protrusion 404 is operable to abut against an edge of rail 200 and provide a stopping point as splice 400 is installed into rail 200. Accordingly, abutment protrusion 404 can prevent splice 400 from being inserted too far into rail 200. It is to be understood, however, that abutment protrusion 104 can be positioned at any position with respect to main body 402 to control a desired installed position of splice 400 in rail 200.

One or more spring flanges 410 can protrude from an aperture 408 of main body 402. Spring flanges 410 can extend at an angle inward from main body 402. In some embodiments, spring flanges 410 can be generally co-planar with a surface of main body 402 and/or extend at an angle away from a center of splice 400.

Spring flanges 410 can similarly have a flange body 412 and a flange tab 414. In some embodiments, flange body 412 may have a narrower width compared to flange tab 414. When flange body 412 is narrower than flange tab 414, flange body 412 provides additional flexibility to allow spring flange 410 to be forced inwards towards a center of splice 400 to accommodate and abut against a surface of rail 200.

Flange tab 414 may extend substantially parallel from flange body 412. Flange tab 414 may have a stiffness or spring coefficient to prevent splice 400 from readily sliding or wiggling out of rail 200, but not so much stiffness to prevent the removal of splice 400 from being removed from a rail 200 by an average human.

Figure 13B:
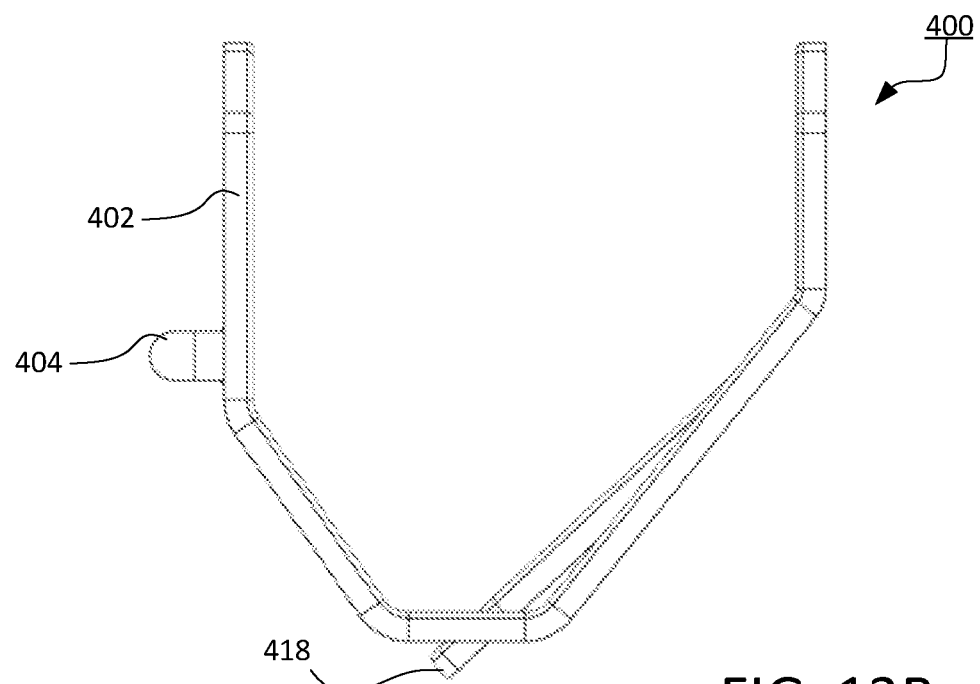
FIG. 13B illustrates an end-view of the splice of FIG. 13A.

FIG. 13B depicts an end view of splice 400. As shown, flange tab 414 may have a bonding edge 118. Bonding edge 118 can extend beyond a bottom end of main body 402. Additionally, bonding edge 118 can be sufficiently dimensioned to pierce a coating on a rail (e.g., rail 200) upon splice 100 being forcibly inserted into the rail. Spring flange 110 may have a stiffness (e.g., via structural rigidity provided by flange body 112 and/or flange tab 114) to cause bonding edge 118 to pierce a coating of rail 200, such as anodization, paint, or powder coating, in order to cause an electrical bonding path.

Figure 14:
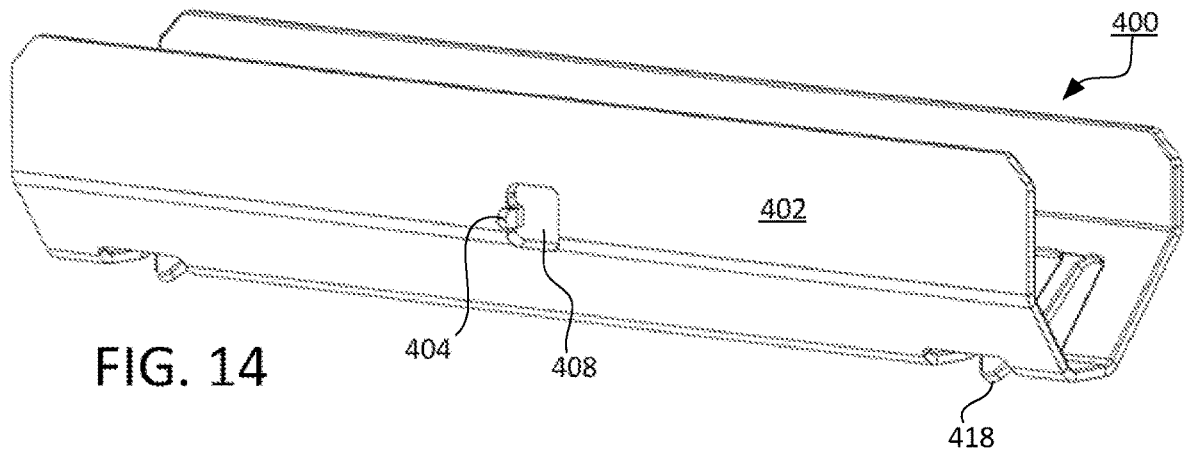
FIG. 14 illustrates an upper perspective side view of the splice of FIG. 13A.

FIG. 14 illustrates a perspective view of splice 400. As shown, main body 402 may have additional apertures 408 near abutment protrusion 404. Apertures 408 can be positioned through main body 402 to reduce a total amount of material used, while also maintaining structural integrity of main body 402.

Figure 15:
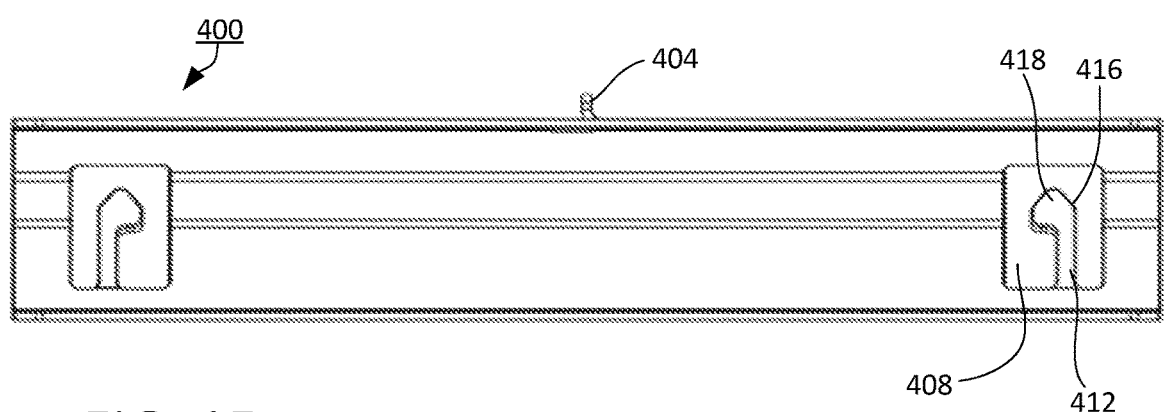
FIG. 15 illustrates a top view of the splice of FIG. 13A.

FIG. 15 illustrates a top view of splice 400. As shown, flange tab 414 may have chamfered tab edges 416 that partially define bonding edge 418. Chamfered tab edges 416 may reduce a volume of flange tab 414 to prevent flange tab 414 from interfering with a rail that splice 400 is being installed into. Furthermore, chamfered tab edges 416 provide a smaller volume to flange tab 414 to provide an easier installation of splice 400 into a rail.

FIG. 16 illustrates an end view of splice 400 installed into a rail 200. In this example embodiment, the second (outer) spring flange 410 is visible, and shown to protrude at an angle away from the centerline of splice and into the dimension of rail 200. Additionally, main body 402 is secured by guides 204.

As further shown in FIG. 16, rail body 202 and inner walls 206 can define cavity 208 to have a shape similar to splice 400. For example, inner walls 206 form a "U" shaped lower end in cavity 208, such that cavity 208 can accept splices 100 that have a similar "U" shape.

Figure 17:
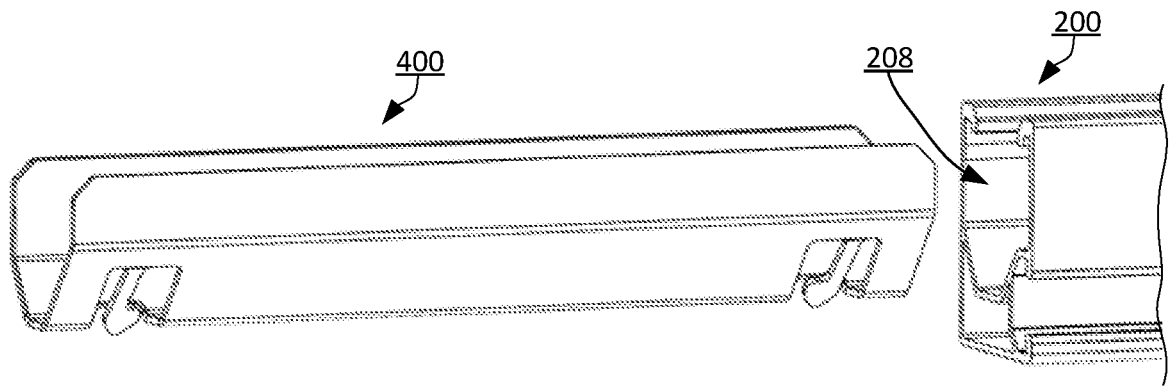
FIGS. 17-19 illustrates various steps of installation of the splice of FIG. 13A installed into the example rail of FIG. 16.
Figure 18:
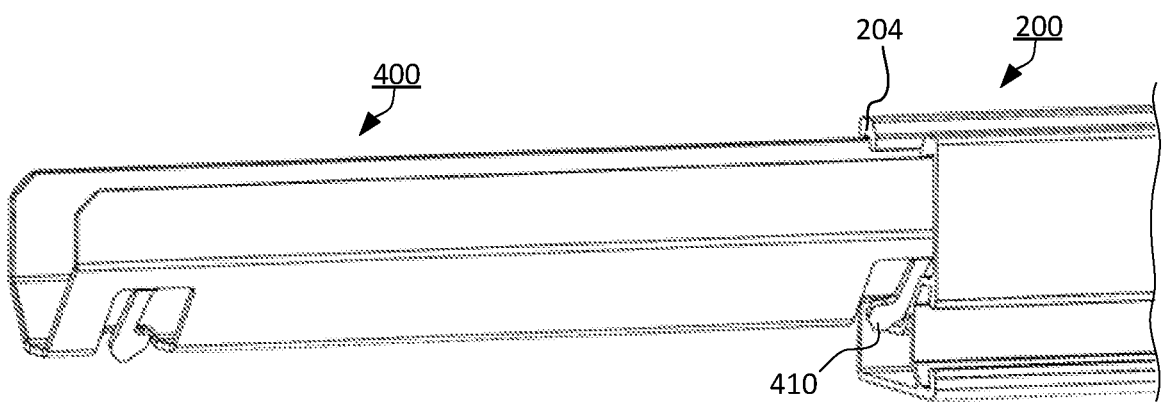
Figure 19:
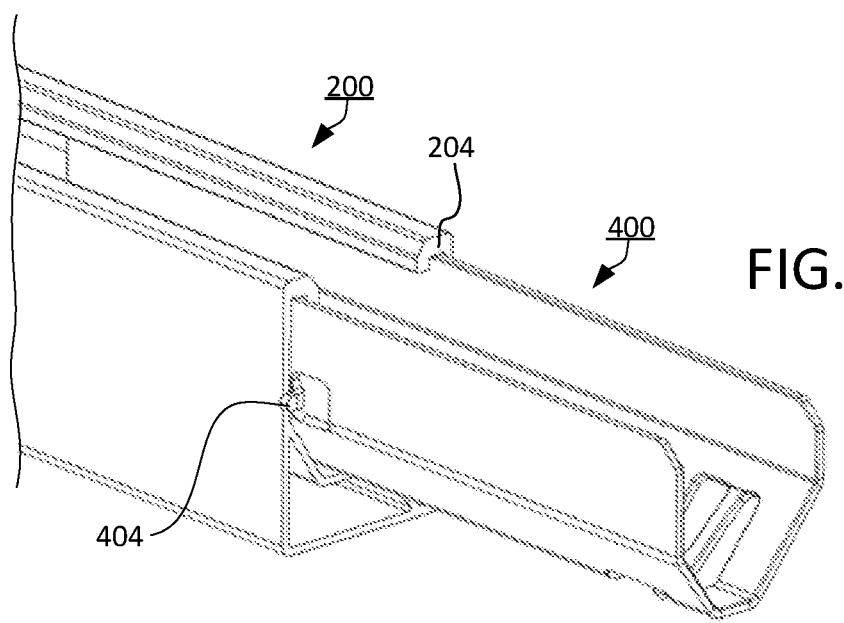

FIGS. 17-19 depict various steps for installing splice 400 into rail 200.

More specifically, FIG. 17 depicts an isometric view of splice 400 being positioned in front of a rail 200.

FIG. 18 depicts splice 400 being partially inserted into rail 200 as a second step of the installation process. At this stage, splice 400 is partially inserted into cavity 208 of rail 200. Furthermore, flange tab 414 has come into contact with rail 200. For splice 400 to continue sliding into rail 200, additional force is required to cause spring flange 410 to bend. In some implementations, a user can press spring flange 410 upwards towards a center of splice 400. Splice 400 can then continue sliding into rail 200 with minimal obstruction. Additionally, splice 400 can slide along guides 204 of rail 200 to facilitate precise installation of splice 400 into rail 200 and minimize undesired lateral or vertical movement.

FIG. 19 depicts an isometric view of splice 400 fully installed into an end of a rail 200. In this example embodiment, abutment protrusion 404 is substantially coincident with and/or abutting against an end edge of rail 200. Although obscured from view, at this step, one spring flange 110 has compressed towards the inward plane of splice 400, while bonding edge 418 has engaged with an inner surface of rail body 202.

In all cases, spring flanges 110, 310 may be at different heights in order to allow for a new section of the rail to be cut or scraped upon splice 100, 300 being re-installed in a different orientation into a rail 200. For example, a first end of a splice 100 may be installed into an end of a rail 200, where a first spring flange 110, 310 cuts through a coating of rail 200 at a first height. Splice 100, 300 may then be removed and spun 180 degrees so that a second end of splice 100, 300 is aligned with the same end of rail 200. Upon installation of the second end of splice 100, 300 into rail 200, the second spring flange 110, 310 will cut through the coating of rail 200 at a different height.

Splice 100, 300 may be made of an aluminum with a higher hardness value than aluminum used in rail 200 to cause bonding edge 118 to pierce an anodization layer. Splice 100 may be also be a wide variety of other materials, including but not limited to stainless steel, aluminum, etc. In other example embodiments, bonding flange may be a stainless steel pin press-fit into the side wall of splice 100. Splice 100 may transfer an adequate moment force from a first rail 200 to a second rail 200 to meet a desired load condition. Splice 100 or external splice 300 may have a substantially similar mechanical properties to transfer a moment across to rail sections, or it may have lower mechanical properties that rail 200.

Figure 20:
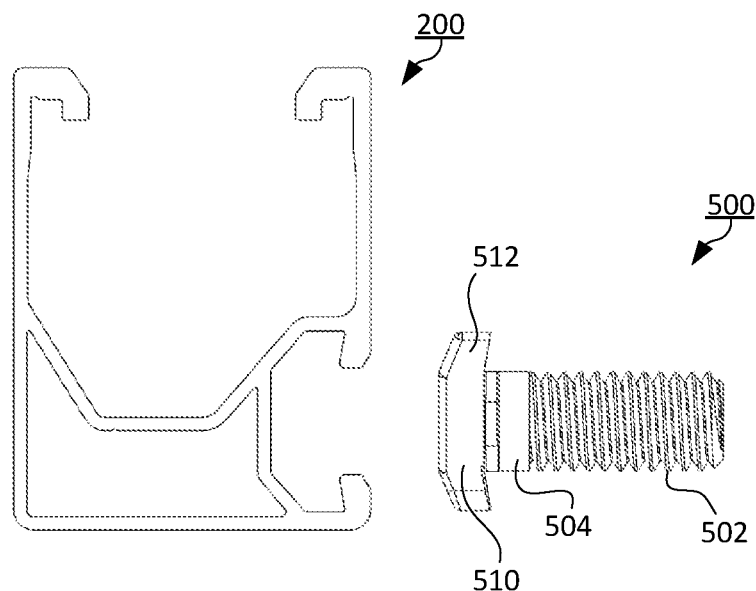
FIG. 20 illustrates a fastener for the rail of FIG. 16.

FIG. 20 illustrates an end view of a rail 200 and a fastener 500. Fastener 500 can have a threaded length 502, a shank 504, and a head 510.

Threaded length 502 is operable to receive objects, such as a mounting assembly or plate. Threaded length 502 can then secure the objects by receiving a female threaded object, such as a nut.

Shank 504 provide structural stability to fastener 500. Shank 504 may be of a similar width or diameter as threaded length 502.

In some embodiments, fastener 500 may be a T-shaped screw, such that head 510 defines a general T-shape for fastener 500. More specifically, head 510 may have a concave face that is defined by distal ends 512 of head 510 angling towards shank 504 and thread length 502. It is further considered that both a top face (e.g., surface away from shank 504) and a bottom face (e.g., surface nearest to shank 504) may be similarly angled. In other words, the top face may also have distal ends angled down towards shank 504. In some embodiments, distal ends 512 may also be tapered, such that distal ends 512 are thinner than a main portion of head 510.

Figure 21:
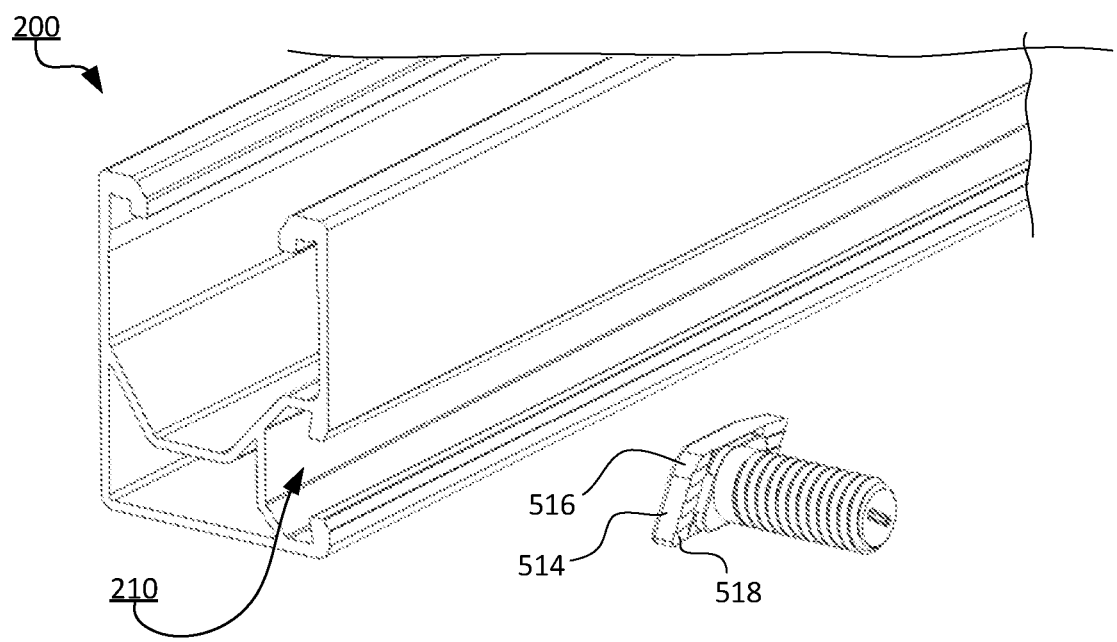
FIG. 21 illustrates a perspective view of the fastener and the rail.

FIG. 21 illustrates a perspective view of rail 200 and fastener 500. Head 510 of fastener 500 may have angled edges 514, chamfered corners 516, and ridges 518.

Angled edges 514 provide an elongated length to head 510, so that head 510 can fill a substantial portion of fastener channel 210 when head 510 is turned to have the length vertical with respect to fastener channel 210. Additionally, angled edges 514 facilitate angular rotation about an axis defined by threaded length 502. Similarly, chamfered corners 516 facilitate rotation of head 510 about the axis defined by threaded length 502. Ridges 518 are operable to prevent excess rotation of head 510 when head 510 is installed in fastener channel 210.

FIGS. 22-25 illustrate various steps for installing fastener 500 into rail 200.

Figure 22:
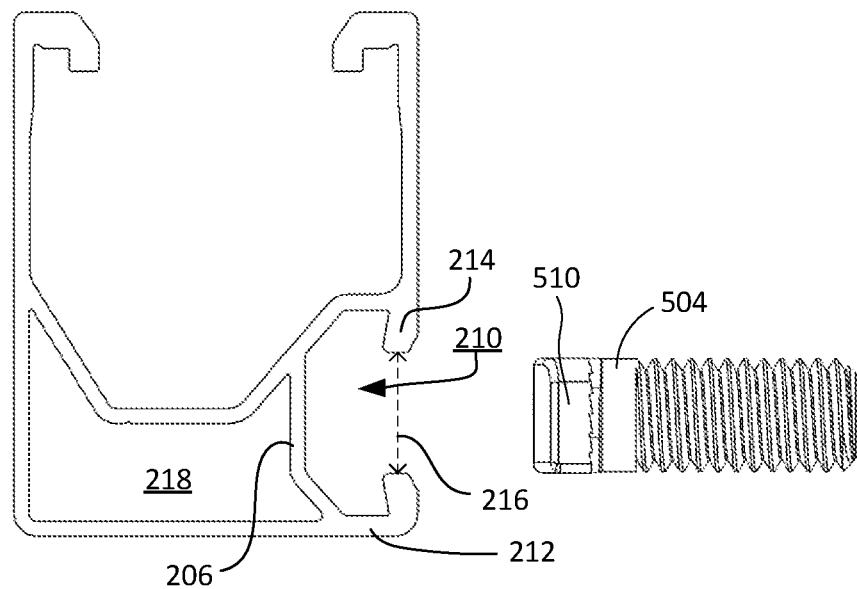
FIGS. 22-26 illustrate various steps of installation of the fastener into the rail.

FIG. 22 illustrates fastener 500 oriented in front of the rail 200, with the length of the fastener 500 substantially parallel with an opening 216 of fastener channel 210. More specifically, opening 216 can be defined by bottom wall 212 and channel flanges 214. Bottom wall 212 may similarly have a channel flange 214 that extends upwards therefrom. Channel flanges 214 can extend inwards around fastener channel 210 to define opening 216. In some embodiments, channel flanges 214 may also extend inwards towards a center of rail 200, such that distal ends of channel flanges 214 are further inwards than portions of rail body 202 that they extend from.

Figure 23:
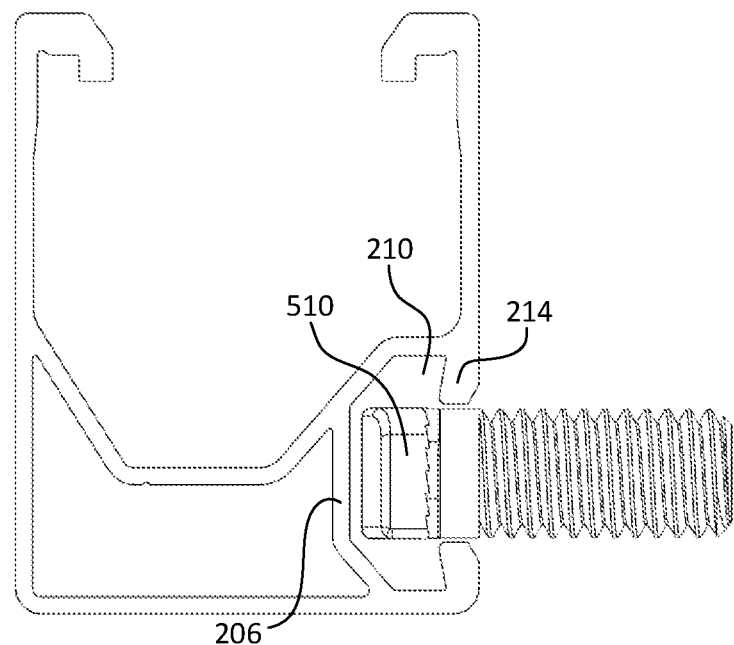

In FIG. 23, head 510 has passed through opening 216 of fastener channel 210, with the head 510 fully into fastener channel 210.

Figure 24:
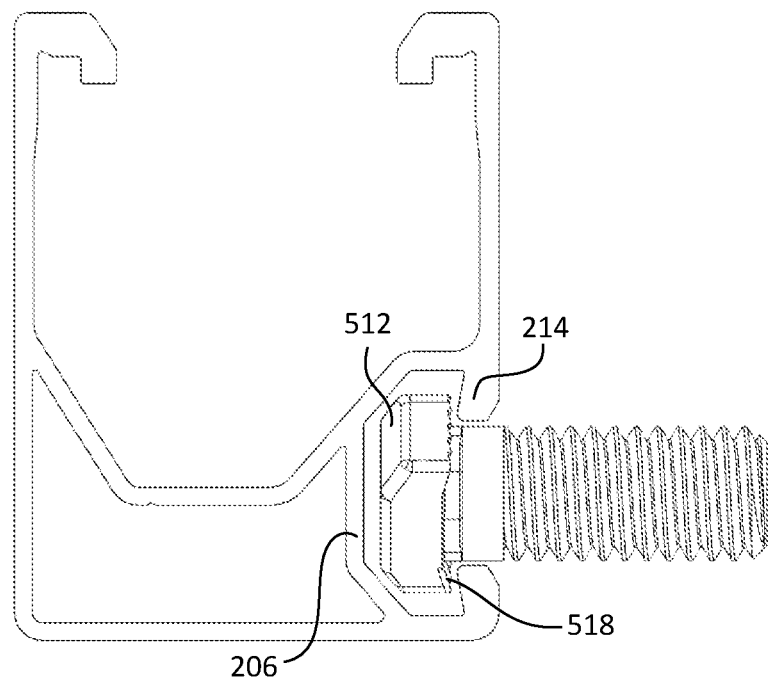

FIG. 24 depicts fastener 500 partially turned along the axis defined along threaded length 502. Here, head 510 is angled to avoid interference with the inner wall 206. As shown, inner wall 206 may have a general "C" shape similar to head 510. Likewise, the "C" shape of inner wall 206 has space to allow for a thicker central portion of the head 510 to fit inside fastener channel 210 and slanted areas to accommodate angled distal ends 512. Furthermore, ridges 518 can interfere with channel flanges 214 to prevent undesired rotation of fastener 500.

Figure 25:
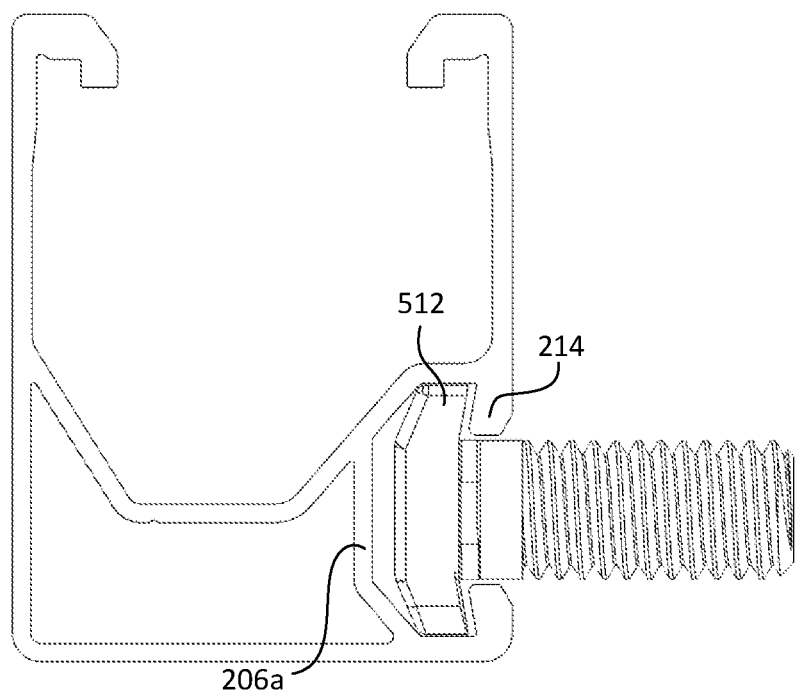

FIG. 25 depicts fastener 500 turned so that distal ends 512 of the head 510 are substantially coincident with inner walls 206 and channel flanges 214 of the fastener channel 210. In this position, head 510 is of a substantially similar shape as fastener channel 210. More specifically, head 510 has a substantially similar shape as a shape defined by inner walls 206 and channel flanges 214. Thus, distal ends 512 are substantially parallel with the some inner walls 206 and channel flanges 214. Furthermore, in some embodiments, inner walls 206 can curve or have angles that cause a curvature greater than a thickness of head 510. For example, inner wall 206a forms a concave wall that curves towards fastener channel 210 at a sharper angle than the angle of distal ends 512 to head 510. Thus, the defined fastener channel 210 may be operable to only accept specific fastener heads (e.g., head 510).

Figure 26:
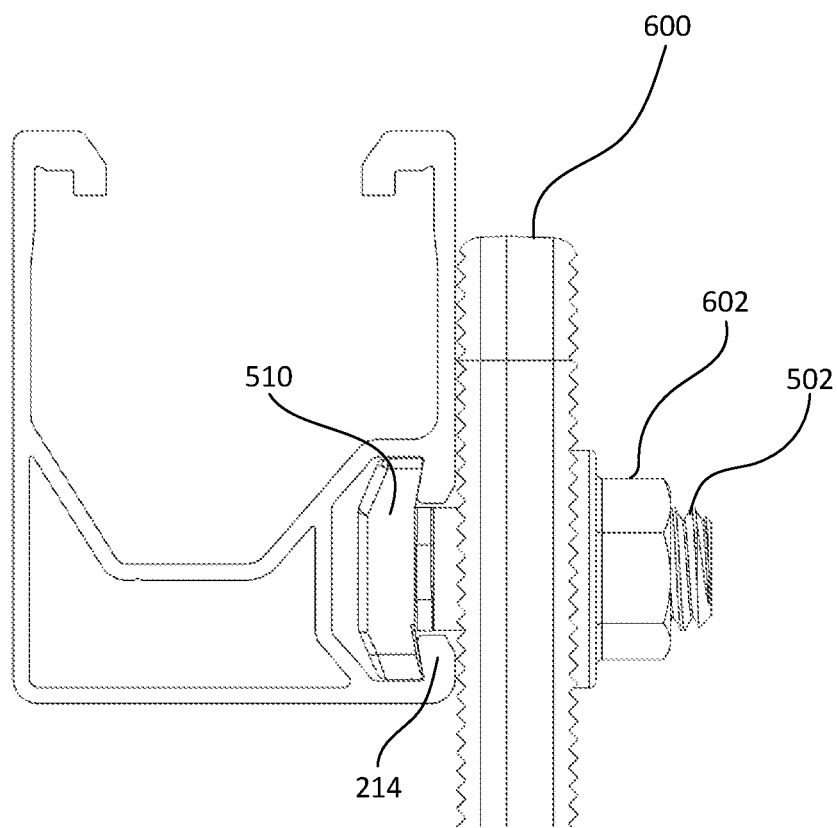

FIG. 26 depicts an end view of the rail 200, fastener 500, mount 600, and nut 602. Nut 602 is threadably engaged with threaded length 502 to compress the rail 200 to mount 600. Head 510 interfaces with channel flanges 214 as nut 602 is threadably engaged onto threaded length 502.

Figure 27:
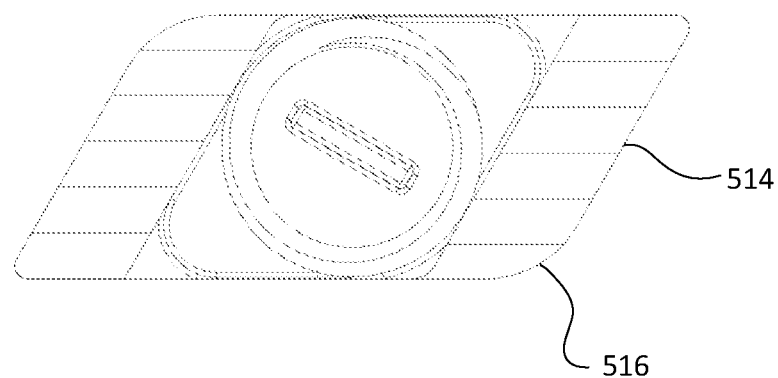
FIG. 27 illustrates a bottom view of the fastener.

FIG. 27 depicts a bottom view of fastener 500. FIG. 27 provides a better view of angled edges 514 and chamfered corners 516. As discussed above, angled edges 514 provide an elongated length to head 510, so that head 510 can fill a substantial portion of fastener channel 210 when head 510 is turned to have the length vertical with respect to fastener channel 210. Additionally, angled edges 514 facilitate angular rotation about an axis defined by threaded length 502. Similarly, chamfered corners 516 facilitate rotation of head 510 about the axis defined by threaded length 502. Ridges 518 are operable to prevent excess rotation of head 510 when head 510 is installed in fastener channel 210.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

What is claimed is:
1. A splice comprising:
    a first sidewall;
    a second sidewall, the first and second sidewalls forming a main body that is substantially "U"-shaped; and
    at least one flange extending from the first sidewall, the at least one flange having a bonding edge with a higher material hardness than a coating disposed on a rail, wherein the bonding edge of the at least one flange is operable to cut into a coating of the rail and form an electrical connection between the rail and the splice.
2. The splice of claim 1, wherein the at least one flange is bent outwardly beyond a surface of the first sidewall.
3. The splice of claim 1, wherein a first portion of the at least one flange is in a same plane as a surface of the first sidewall, and a second portion of the at least one flange extends from and beyond the surface of the first sidewall.

4. The splice of claim 1, wherein the bonding edge of the at least one flange is angled.

5. The splice of claim 1, wherein the bonding edge of the at least one flange has a smooth surface.

6. The splice of claim 1, further comprising:
an abutment protrusion extending outwardly from the splice, wherein the abutment protrusion and the splice are operable to abut against an end of the rail to prevent the splice from fully entering the rail.

7. The splice of claim 1, wherein the splice is formed from a uniform material.

8. The splice of claim 1, wherein distal edges of the first or the second sidewall are chamfered.

9. The splice of claim 1, wherein the at least one flange extends beyond a bottom surface of the main body, the at least one flange operable to flex when in communication with a surface of the rail.

10. The splice of claim 1, wherein the at least one flange is constructed separately from the splice and attached onto the splice.

11. An assembly comprising:
a rail; and
a splice, the splice having:
 a main body;
 a first sidewall;
 a second sidewall, the first and second sidewalls forming a main body that is substantially "U" shaped; and
 one or more flanges extending from the first sidewall, the one or more flanges having a bonding edge with a higher material hardness than a coating disposed on the rail, wherein the bonding edge of the one or more flanges are operable to cut into a coating of the rail and form an electrical connection between the rail and the splice.

12. The assembly of claim 11, wherein the rail has guides along a length of a rail body, the guides extending over and into the opening of the rail.

* * * * *